United States Patent
Awoniyi-Oteri et al.

(10) Patent No.: US 11,452,017 B2
(45) Date of Patent: Sep. 20, 2022

(54) TRANSMISSION CONFIGURATION INDICATION (TCI) STATE/BEAM DETERMINATION FOR NR DUAL ACTIVE PROTOCOL STACK (DAPS) HANDOVER

(71) Applicant: QUALCOMM Incorporated, San Diego, CA (US)

(72) Inventors: Olufunmilola Omolade Awoniyi-Oteri, San Diego, CA (US); Tao Luo, San Diego, CA (US); Hung Dinh Ly, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/004,600

(22) Filed: Aug. 27, 2020

(65) Prior Publication Data
US 2021/0068021 A1    Mar. 4, 2021

Related U.S. Application Data

(60) Provisional application No. 62/911,134, filed on Oct. 4, 2019, provisional application No. 62/894,412, filed on Aug. 30, 2019.

(51) Int. Cl.
*H04W 36/18* (2009.01)
*H04W 72/12* (2009.01)
*H04W 36/06* (2009.01)

(52) U.S. Cl.
CPC ....... *H04W 36/18* (2013.01); *H04W 72/1247* (2013.01); *H04W 36/06* (2013.01)

(58) Field of Classification Search
None
See application file for complete search history.

(56) References Cited

U.S. PATENT DOCUMENTS

| | | | |
|---|---|---|---|
| 2014/0153423 A1* | 6/2014 | Shin | H04W 36/18 370/252 |
| 2019/0253904 A1 | 8/2019 | Tsai et al. | |

(Continued)

OTHER PUBLICATIONS

Intel Corporation, et al., "Proposal for TEI: Simultaneous Rx/Tx of Channels/RS in FR2", 3GPP Draft; 3GPP TSG RAN Meeting #98, R1-1908666, 3rd Generation Partnership Project (3GPP), Mobile Competence Centre; 650, Route Des Lucioles; F-06921 Sophia-Antipolis Cedex; France, vol. TSG RAN, No. Prague, CZ; Aug. 26, 2019-Aug. 30, 2019, Aug. 17, 2019 (Aug. 17, 2019), XP051765274, 4 Pages, Retrieved from the Internet: URL: http://www.3gpp.org/ftp/tsg_ran/WG1_RL1/TSGR1_98/Docs/R1-1908666.zip, [retrieved on Aug. 17, 2019], p. 2, paragraph 2.

(Continued)

*Primary Examiner* — Kodzovi Acolatse
(74) *Attorney, Agent, or Firm* — Arent Fox, LLP

(57) ABSTRACT

In an aspect, the present disclosure includes a method, apparatus, and computer readable medium for wireless communications for connecting, by a user equipment (UE), to a source cell via a first transmission configuration indication (TCI) state; connecting, by the UE, to a target cell via a second TCI state during a handover from the source cell to the target cell; determining, by the UE, whether a first transmission using the first TCI state overlaps in time with a second transmission using the second TCI state; and performing, by the UE, TCI selection between the first beam and the second TCI state based at least in part on the determination of whether the first transmission using the first TCI state overlaps or does not overlap with the second transmission using the second TCI state.

32 Claims, 11 Drawing Sheets

(56) References Cited

U.S. PATENT DOCUMENTS

| | | | |
|---|---|---|---|
| 2019/0260445 A1 | 8/2019 | John Wilson et al. | |
| 2020/0021336 A1* | 1/2020 | Da Silva | H04B 17/309 |
| 2020/0221485 A1* | 7/2020 | Cirik | H04B 7/0695 |
| 2020/0288359 A1* | 9/2020 | Kim | H04W 36/08 |
| 2020/0314714 A1* | 10/2020 | Jung | H04W 76/30 |
| 2020/0314773 A1* | 10/2020 | Hsieh | H04W 36/08 |
| 2021/0051539 A1* | 2/2021 | Zhang | H04W 72/04 |

OTHER PUBLICATIONS

Intel Corporation: On Scheduling/HARQ Enhancements for eURLLX, 3GPP TSG RAN WG1 Meeting#97, R1-1908648 Intel-EURLLC SCHEDHARQ, 3rd Generation Partnership Project (3GPP), Mobile Competence Centre; 650, Route Des Lucioles; F-06921, Sophia-Antipolis Cedex; France, vol. RAN WG1, No. Prague, CZ; Aug. 26, 2019-Aug. 30, 2019, Aug. 17, 2019 (Aug. 17, 2019), XP051765256, 14 Pages, Retrieved from the Internet: URL: http://www.3gpp.org/ftp/tsg_ran/WG1_RL1/TSGR1_98/Docs/R1-1908648.zip, [retrieved on Aug. 17, 2019], p. 12, paragraph 4.

* cited by examiner

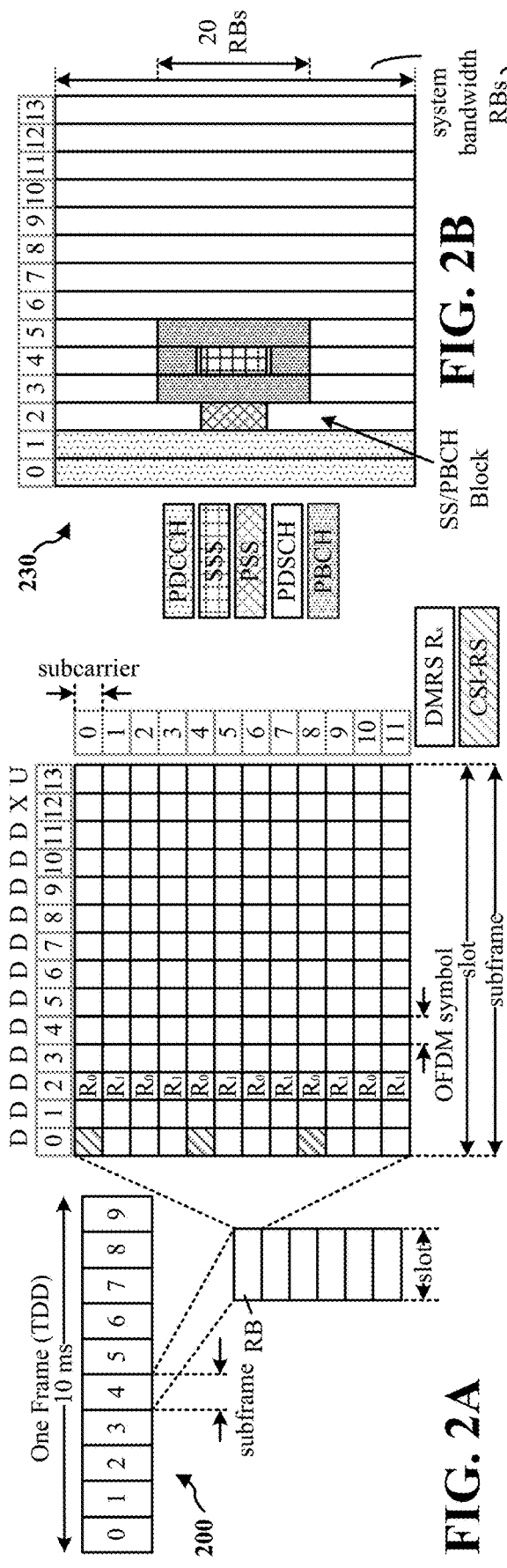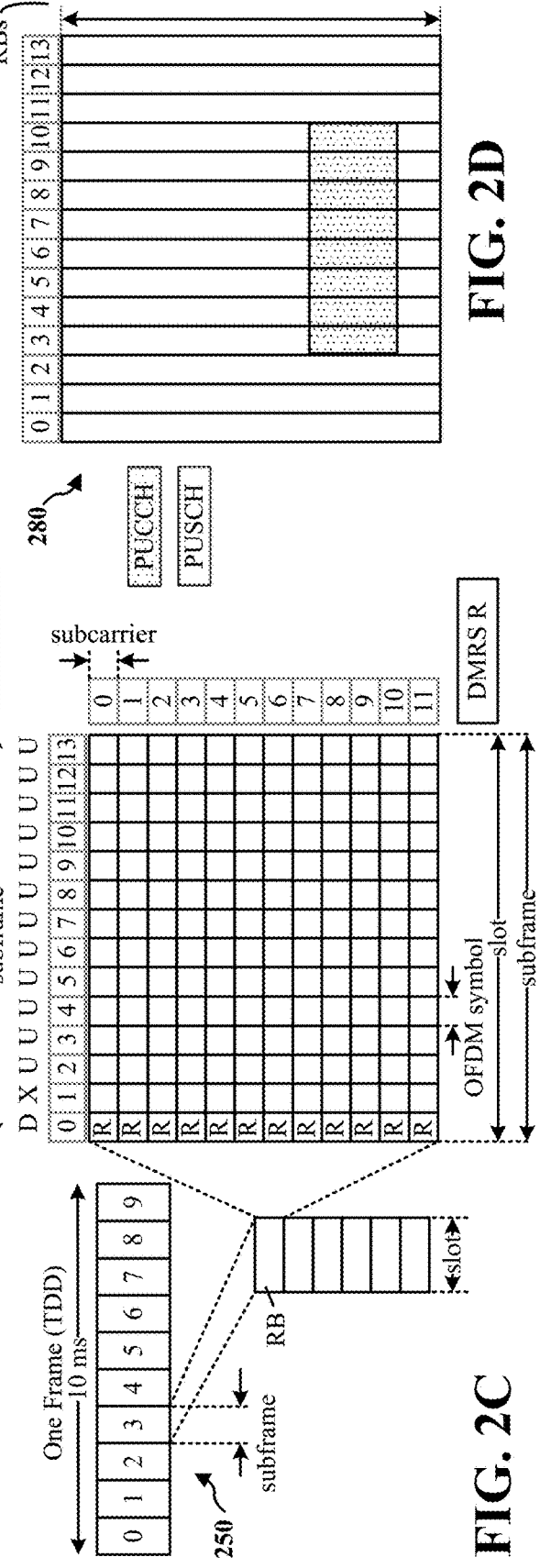

TRANSMISSION CONFIGURATION INDICATION (TCI) STATE/BEAM DETERMINATION FOR NR DUAL ACTIVE PROTOCOL STACK (DAPS) HANDOVER

CROSS-REFERENCE TO RELATED APPLICATION(S)

The present application claims benefit of U.S. Provisional Application No. 62/894,412 entitled "TRANSMISSION CONFIGURATION INDICATION (TCI) STATE/BEAM DETERMINATION FOR NR MAKE-BEFORE-BREAK HANDOVER" filed Aug. 30, 2019, and U.S. Provisional Application No. 62/911,134 entitled "TRANSMISSION CONFIGURATION INDICATION (TCI) STATE/BEAM DETERMINATION FOR NR MAKE-BEFORE-BREAK HANDOVER" filed Oct. 4, 2019, each of which is assigned to the assignee hereof and hereby expressly incorporated by reference herein.

BACKGROUND

The present disclosure relates generally to communication systems, and more particularly, to transmission configuration indication (TCI) state/beam determination for new radio (NR) Dual Active Protocol Stack (DAPS) handover (HO).

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Due to the increasing demand for wireless communications, there is a desire to improve the efficiency of wireless communication network techniques.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication, including connecting, by a user equipment (UE), to a source cell via a first beam. The method further includes connecting, by the UE, to a target cell via a second beam during a handover from the source cell to the target cell. The method may further include determining, by the UE, whether a first transmission using the first beam overlaps in time with a second transmission using the second beam. The method may further include performing, by the UE, beam selection between the first beam and the second beam based at least in part on the determination of whether the first transmission using the first beam overlaps with the second transmission using the second beam.

Another example implementation includes an apparatus for wireless communication, including a processor and a memory in communication with the processor. The memory storing instructions which, when executed by the processor, cause the processor to connect, by a user equipment (UE), to a source cell via a first beam. The instructions when executed by the processor further cause the processor to connect, by the UE, to a target cell via a second beam during a handover from the source cell to the target cell. Additionally, the instructions when executed by the processor further cause the processor to determine, by the UE, whether a first transmission using the first beam overlaps in time with a second transmission using the second beam. Additionally, the instructions when executed by the processor cause the processor to perform, by the UE, beam selection between the first beam and the second beam based at least in part on the determination of whether the first transmission using the first beam overlaps with the second transmission using the second beam.

Another example implementation includes an apparatus for wireless communication, including means for connecting, by a user equipment (UE), to a source cell via a first beam. The apparatus further includes means for connecting, by the UE, to a target cell via a second beam during a handover from the source cell to the target cell. Additionally, the apparatus includes means for determining, by the UE, whether a first transmission using the first beam overlaps in time with a second transmission using the second beam. Additionally, the apparatus includes means for performing, by the UE, beam selection between the first beam and the second beam based at least in part on the determination of whether the first transmission using the first beam overlaps with the second transmission using the second beam.

Another example implementation includes a non-statutory computer-readable medium storing instructions for wireless communication, executable by a processor to connect, by a user equipment (UE), to a source cell via a first beam. The instructions are further executable to connect, by the UE, to a target cell via a second beam during a handover from the source cell to the target cell. Additionally, the instructions are executable to determine, by the UE, whether a first transmission using the first beam overlaps in time with a second transmission using the second beam. Additionally, the instructions are executable to perform, by the UE, beam selection between the first beam and the second beam based at least in part on the determination of whether the first transmission using the first beam overlaps with the second transmission using the second beam.

One or more of the above examples may further include performing beam selection which comprises performing beam selection between the first beam and the second beam based on one or more parameters in response to the determination that the first transmission using the first beam and the second transmission using the second beam overlap.

One or more of the above examples may further include that the one or more parameters include at least one of a type of cell, a type of channel, and a quality of service (QoS).

One or more of the above examples may further include performing beam selection between the first beam and the second beam based at least in part on the one or more parameters in response to the determination that the first transmission using the first beam and the second transmission using the second beam overlap further comprises: establishing, by the UE, a time period for prioritizing the target cell over the source cell; performing, by the UE, beam selection with the target cell over the source cell for the time period; determining, by the UE, whether a prioritization timer corresponding to the time period has expired; and performing, by the UE, beam selection to switch from the target cell to the source cell based on the determination that the prioritization timer has expired.

One or more of the above examples may further include maintaining, by the UE, the beam selection with the target cell over the source cell based on the determination that the prioritization timer has not expired.

One or more of the above examples may further include performing beam selection between the first beam and the second beam based at least in part on the one or more parameters in response to the determination that the first transmission using the first beam overlaps the second transmission using the second beam further comprises: determining, by the UE, that a first Physical Downlink Control Channel (PDCCH) beam corresponding to one of the source cell or the target cell is received without interruption; performing, by the UE, beam selection for a reception of a Physical Downlink Shared Channel (PDSCH) beam associated with the PDCCH beam over a reception of a second PDCCH corresponding to the other one of the source cell or the target cell.

One or more of the above examples may further include performing beam selection for the reception of the PDSCH beam associated with the PDCCH beam over the reception of the second PDCCH corresponding to the other one of the source cell or the target cell further comprises performing beam selection for the reception of the PDSCH beam associated with the PDCCH beam over the reception of the second PDCCH corresponding to the other one of the source cell or the target cell based on a determination that a prioritization timer has not expired.

One or more of the above examples may further include performing beam selection between the first beam and the second beam based on the one or more parameters in response to the determination that the first transmission using the first beam overlaps the second transmission using the second beam further comprises: determining, by the UE, that the first beam and the second beam correspond to overlapping PDSCHs; determining, by the UE, a priority level of a first application associated with the first beam and a priority level of a second application associated with the second beam; performing, by the UE, beam selection with the target cell over the source cell based on the determination that the priority level of the first application associated with the first beam is prioritized than the priority level of the second application associated with the second beam; and performing, by the UE, beam selection with the source cell over the target cell based on the determination that the priority level of the first application associated with the first beam is higher than the priority level of the second application associated with the second beam.

One or more of the above examples may further include performing beam selection with the target cell over the source cell based on the determination that the priority level of the first application associated with the first beam is prioritized than the priority level of the second application associated with the second beam further comprises performing beam selection with the target cell over the source cell based on a determination that a prioritization timer has not expired.

One or more of the above examples may further include performing beam selection further comprises performing beam selection between the first beam and the second beam based at least in part on the determination that the first transmission using the first beam does not overlap with the second transmission using the second beam.

One or more of the above examples may further include performing beam selection between the first beam and the second beam based at least in part on the determination that the first transmission using the first beam does not overlap the second transmission using the second beam further comprises determining, by the UE, that a distance in time between physical channels of the source cell and the target cell fails to satisfy a beam switching threshold.

One or more of the above examples may further include identifying, by the UE, an earliest received physical channel from either the source cell or the target cell; and performing, by the UE, beam selection with either the source cell or the target cell associated with the earliest received physical channel.

One or more of the above examples may further include determining, by the UE, that a first Physical Downlink Control Channel (PDCCH), associated with the target cell having priority over the source cell, is received before a second PDCCH associated with the source cell; and performing, by the UE, beam selection for a Physical Downlink Shared Channel (PDSCH) associated with the target cell.

One or more of the above examples may further include performing beam selection between the first beam and the second beam in response to a determination that the first transmission using the first beam does not overlap with the second transmission using the second beam further comprises: determining, by the UE, that a distance in time between reception of a Physical Downlink Control Channel (PDCCH) associated with the source cell and a Physical Downlink Shared Channel (PDSCH) associated with the target fails to satisfy a beam switching threshold, wherein the target cell has priority over the source cell; utilizing, by the UE, a beam for a PDCCH associated with the target cell and a determined beam for the PDSCH associated with the target cell.

One or more of the above examples may further include determining whether the first transmission using the first beam overlaps in time with the second transmission using the second beam includes determining whether a physical downlink shared channel (PDSCH) with a TCI state explicitly indicated in a downlink control information (DCI) or indicated by a transmission configuration indication (TCI) state of a scheduling PDCCH overlaps with a PDSCH with a TCI state derived from a monitored search space with the lowest CORESET-ID in a latest slot, and wherein performing beam selection between the first beam and the second beam is based at least in part on a determination that the PDSCH with the TCI state explicitly indicated in the DCI or indicated by the TCI state of the scheduling PDCCH overlaps with the PDSCH with the TCI state derived from the monitored search space with the lowest CORESET-ID in the latest slot.

One or more of the above examples may further include performing the beam selection between the PDSCH with the TCI state explicitly indicated in the DCI or indicated by the TCI of the scheduling PDCCH and the PDSCH with the TCI state derived from the monitored search space with the lowest CORESET-ID in the latest slot is based on a reliability of the TCI states of the PDSCHs.

One or more of the above examples may further include performing the beam selection between the PDSCH with the TCI state explicitly indicated in the DCI or indicated by the TCI of the scheduling PDCCH and the PDSCH with the TCI state derived from the monitored search space with the lowest CORESET-ID in the latest slot includes selecting the PDSCH with TCI state explicitly indicated in the DCI or indicated by the TCI of the scheduling PDCCH.

One or more of the above examples may further include performing the beam selection between the PDSCH with the TCI state explicitly indicated in the DCI or indicated by the TCI of the scheduling PDCCH and the PDSCH with a TCI state derived from the monitored search space with the lowest CORESET-ID in the latest slot is further based on at least one of: a priority level of the source cell or the target cell, or a network configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
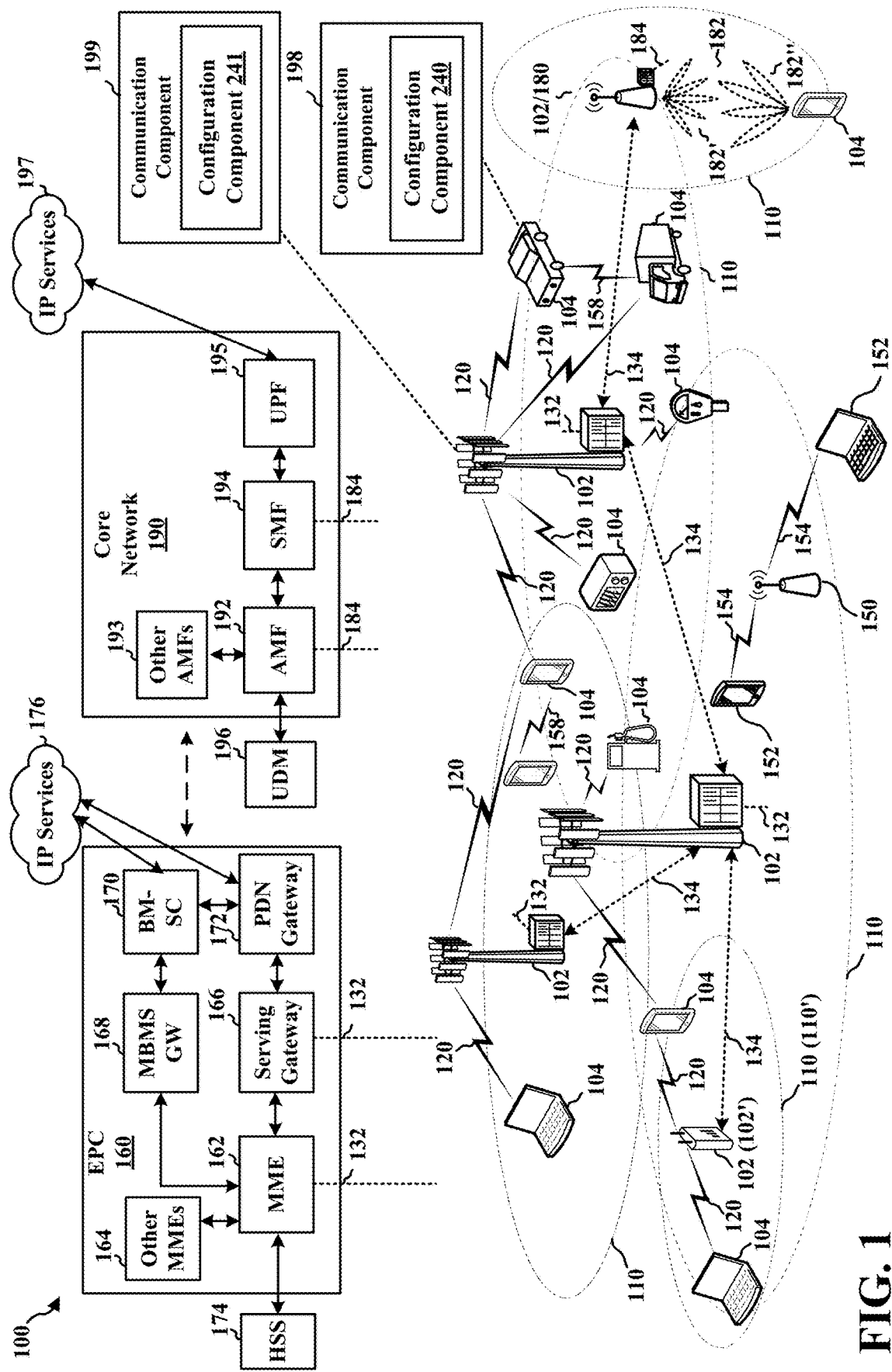
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The described aspects relate to apparatus and methods for beam determination for NR Dual Active Protocol Stack (DAPS) handover (HO) in wireless communication systems. For example, in an aspect, during the DAPS HO, the UE is expected to maintain connectivity with the source cell and target cell. This simultaneous connectivity may require that certain beams/panels of the UE to be used for transmission and reception from the source cell and the target cell. As such, the present disclosure provides techniques for the UE to determine the beams for a variety of overlapping and non-overlapping scenarios.

FIG. 1 is a diagram illustrating an example of a wireless communications system and an access network 100 configured for beam determination for NR DAPS HO. The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, the UE 104 may be configured to operate communication component 198 and/or configuration component 240 to connect to a source cell via a first beam, connect to a target cell via a second beam during a handover from the source cell to the target cell, determine whether a first transmission using the first beam overlaps in time with a second transmission using the second beam, and performing beam selection between the first beam and the second beam based at least in part on the determination of whether the first transmission using the first beam overlaps with the second transmission using the second beam.

Correspondingly, in certain aspects, the network entity 102 (e.g., base station) may be configured to operate communication component 199 and/or configuration component 241 to transmit one or more beams to UE 104.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 110 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include diagrams of example frame structures and resources that may be utilized in communications between the base stations 102, the UEs 104, and/or the secondary UEs (or sidelink UEs) 110 described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
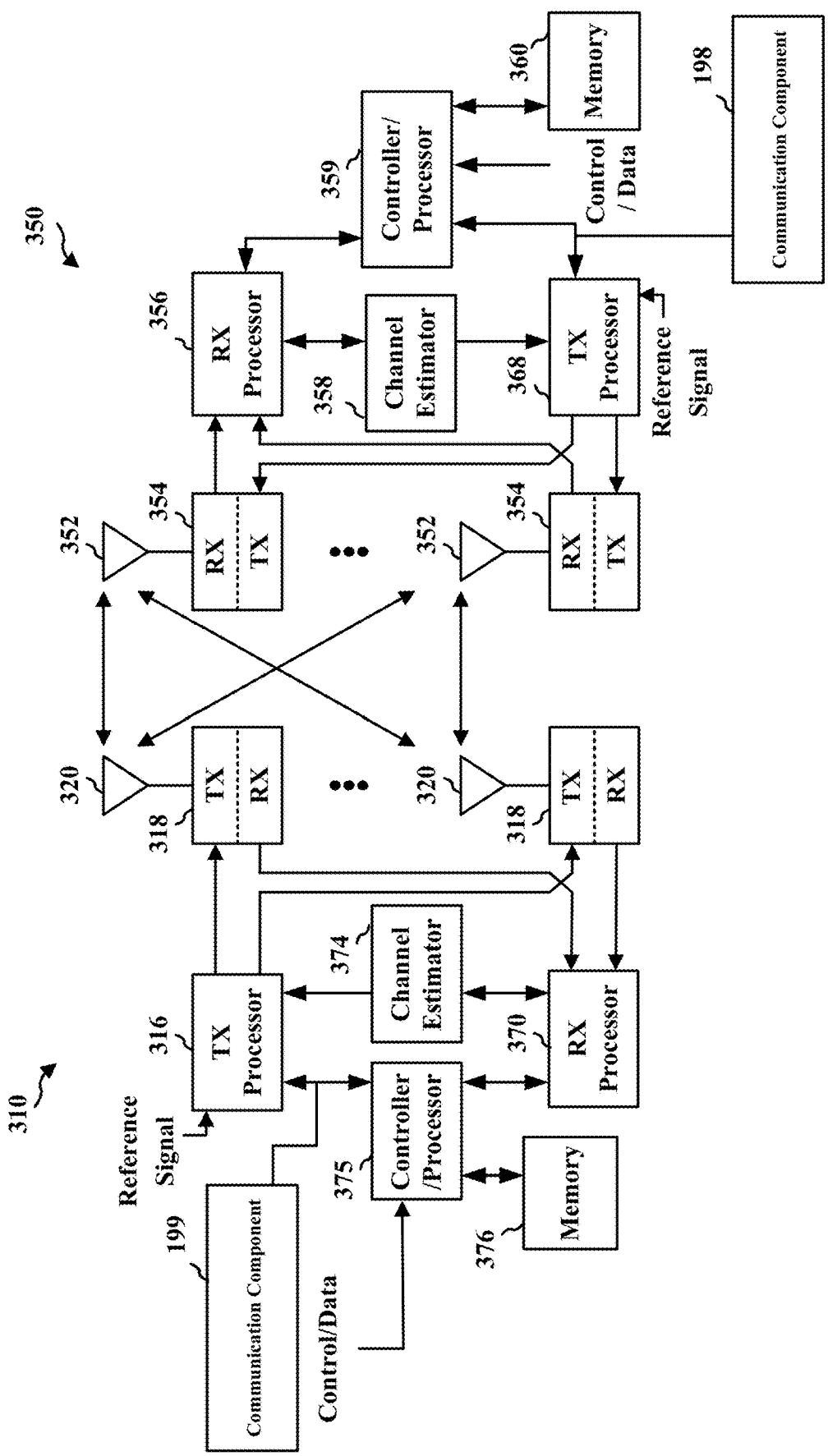
FIG. 3 is a diagram illustrating an example of a base station and user equipment (UE) in an access network.

FIG. 3 is a block diagram of a base station 310 in communication with a UE 350 in an access network, where the base station 310 may be an example implementation of base station 102 and where UE 350 may be an example implementation of UE 104. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with communication component 198 of FIG. 1.

At least one of the TX processor 316, the RX processor 370, and the controller/processor 375 may be configured to perform aspects in connection with communication component 199 of FIG. 1.

Referring to FIGS. 4-9, the described features generally relate to beam determination for NR DAPS HO. For example, in Release 15, a defined major goal for mobility enhancement is to accomplish zero (0) milliseconds (ms) interruption time during HO. During the DAPS HO, the UE is expected to maintain connectivity with the source cell and the target cell. This simultaneous connectivity may require that certain beams/panels are used for transmission and reception from the source cell and the target cell.

Since the UE may simultaneously be connected to two cells, and is communicating via time-division-multiplexing (TDM), the UE needs to determine how to select which beam to use for the reception of PDSCH. As such, the present disclosure provides techniques for the UE to determine the beams for a variety of overlapping and non-overlapping scenarios.

For example, in an aspect, the present disclosure includes a method, apparatus, and non-statutory computer readable medium for wireless communications for connecting, by a user equipment (UE), to a source cell via a first beam. The aspect further includes connecting, by the UE, to a target cell via a second beam during a handover from the source cell to the target cell. Additionally, the aspect further includes determining, by the UE, whether a first transmission using the first beam overlaps in time with a second transmission using the second beam. Additionally, the aspect further includes performing, by the UE, beam selection between the first beam and the second beam based at least in part on the determination of whether the first transmission using the first beam overlaps with the second transmission using the second beam.

Figure 4:
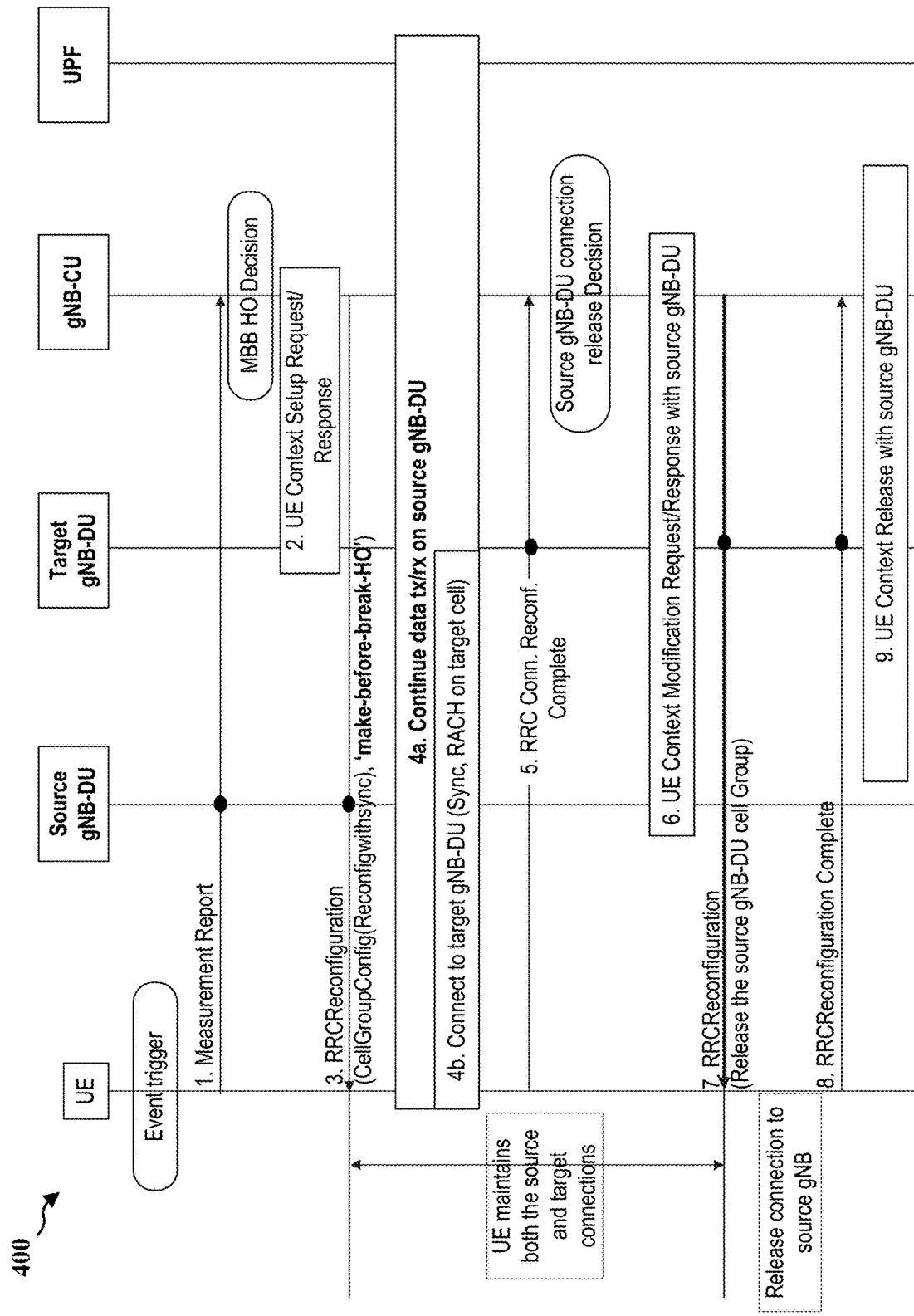
FIG. 4 is a diagram illustrating an example of a call flow for Dual Active Protocol Stack (DAPS) intra-gNB dual Tx/Rx.

FIG. 4 is a diagram 400 illustrating an example of call flow for DAPS HO intra-gNB dual Tx/Rx between a UE and at least a source cell (e.g., source gNB) and target cell (e.g., target gNB). For example, the UE may be similar to or the same as UE 104 of FIG. 1, and the gNBs may be similar to or the same as base stations 102.

In an aspect, at step 1, an event trigger may occur at the UE causing the UE to communicate a measurement report with the gNB-CU. For example, the measurement report may indicate to the gNB-CU that the UE initiated a DAPS HO. Accordingly, gNB-CU may make a DAPS HO decision in response to receiving the measurement report.

In an aspect, at step 2, gNB-CU and target gNB-DU may generate a UE context setup request/response. At step 3, the gNB-CU may transmit an RRC Reconfiguration to the UE. For example, the RRC Reconfiguration message may include CellGroupConfig (Reconfigwithsync) information along with an indication for the UE to initiate an DAPS HO procedure. Upon reception of the RRC Reconfiguration message, UE may maintain connections with both the source cell and target cell until the handover is complete.

In an aspect, at step 4a, the UE may continue data transmission and reception on the source gNB-DU. At step 4b, the UE may connect to target gNB-DU including synchronization and RACH on the target cell. Upon connection with the target gNB-DU, at step 5, the UE may transmit an RRC Connection Reconfiguration Complete message to the gNB-CU. Upon reception of the RRC Connection Reconfiguration Complete message, the gNB-CU may determine a release decision.

In an aspect, at step 6, source gNB-DU, target gNB-DU, and gNB-CU may determine a UE Context Modification Request/Response with the source gNB-DU. At step 7, the gNB-CU may transmit RRC Reconfiguration message that releases the source gNB-DU cell group. Upon reception of the RRC Reconfiguration message, the UE may release connection to the source gNB.

In an aspect, at step 8, the UE may transmit a RRC Reconfiguration Complete message to gNB-CU. At step 9, gNB-CU and target gNB-DU determine a UE Context Release with the source gNB-DU.

Figure 5A:
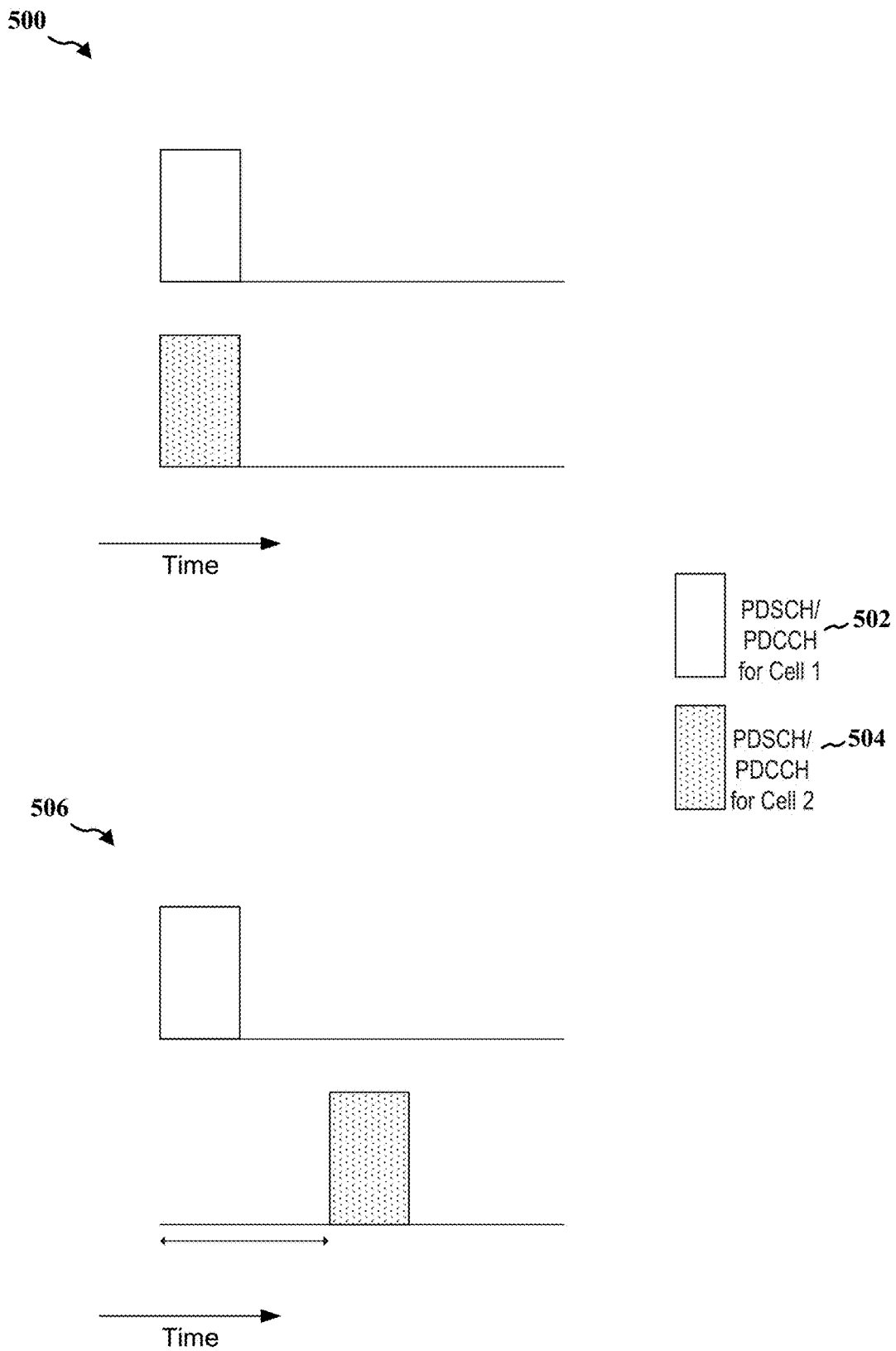
FIG. 5A is a diagram of signaling over time illustrating an example of an overlapping scenario and a non-overlapping scenario for beam detection during DAPS HO.

FIG. 5A is a diagram 500 illustrating an example of an overlapping scenario and a non-overlapping scenario for beam detection during DAPS HO. For example, the UE may be similar to or the same as UE 104 of FIG. 1, and the source cell and target cell may be similar to or the same as base stations 102.

In an aspect, overlapping scenario 500 illustrates a scenario in which the PDSCH/PDCCH 502 for cell 1 (e.g., a target cell) overlaps (wherein at least a portion of the beam may overlap in time with another beam) PDSCH/PDCCH 504 for cell 2 (e.g., a source cell). For example, the beams for each cell may be selected as described herein. In this example, beams used for the transmission of the PDCCH and/or the PDSCH may be derived from measurement made from SS-block/CSI-RS.

For PDCCH, the MAC indicated TCI state for a CORE-SET associated with the PDCCH indicates the associated spatial filter (hence, beam) used for PDCCH transmission. Accordingly, CORESET 0 typically follows the beam identified during the initial access procedure.

For PDSCH, one of a number of schemes may be used depending on the configured CORESET(s) and/or whether or not a non fallback DCI includes a configured transmission configuration indication (TCI).

Figure 5B:
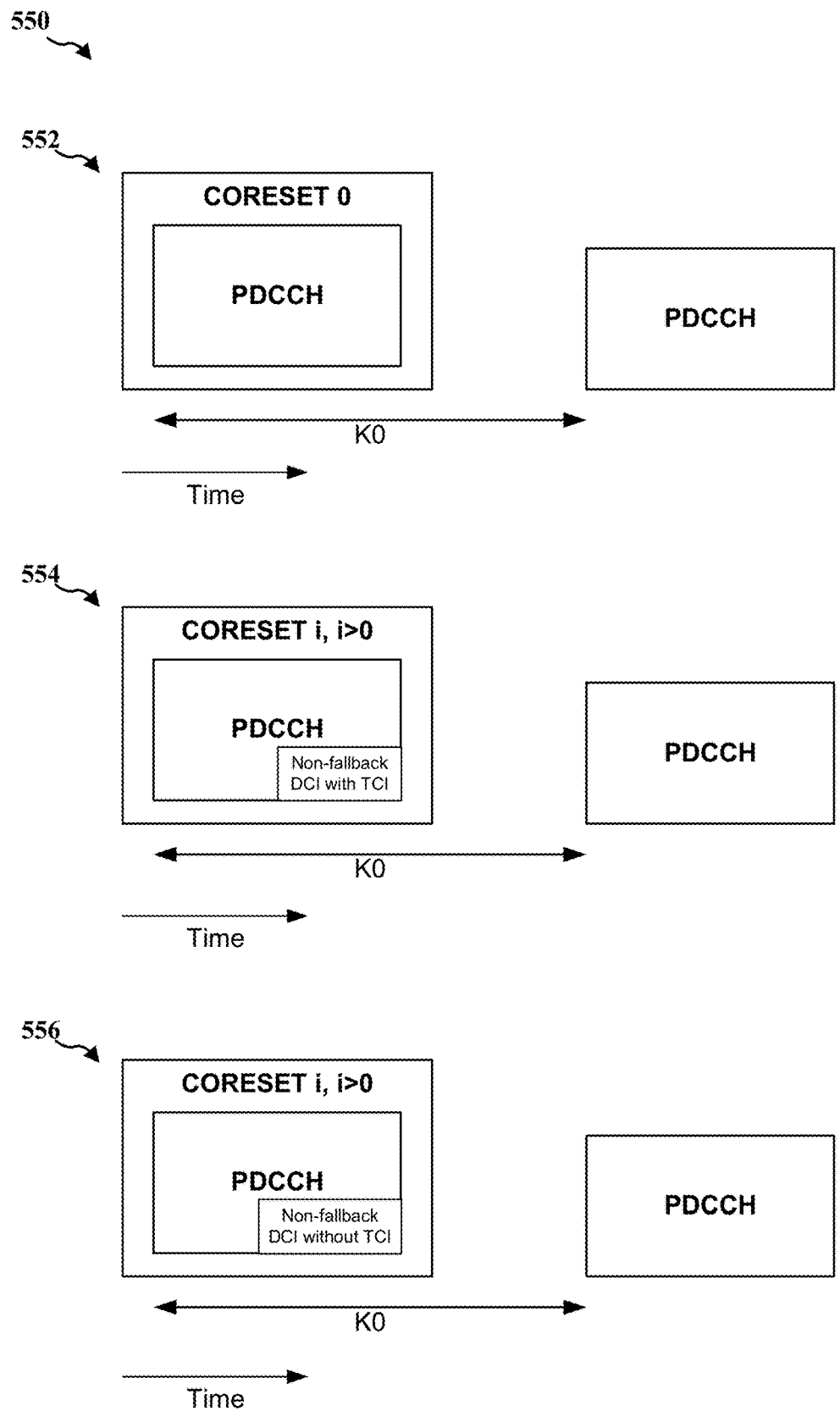
FIG. 5B is a conceptual diagram of an example beam determination, including signaling over time, in accordance with various aspects of the present disclosure.

For example, referring to FIG. 5B, a conceptual diagram of a number of beam determination schemes 550 includes a first scheme 552 associated with a single CORESET, and a second scheme 554 and a third scheme 556 each associated with whether or not a non fallback DCI exists. Specifically, in the first scheme 552, which may correspond to when only one CORESET is configured, e.g., scheduling PDCCH configured with only CORESET 0, the PDSCH transmission configuration indication (TCI) may follow CORESET 0. For example, for all K0s, PDSCH TCI may follow TCI state of CORESET 0, which may correspond to the scenario for when more than one CORESET is configured. In the second scheme 554, for CORESET i with non-fallback DCI and with a configured TCI, scheduling PDCCH may be configured with CORESET i, where i is greater than 0. In one aspect, when K0 is greater than a threshold, PDSCH TCI may follow the TCI indicated by a non-fallback DCI. However, if K0 is less than or equal to the threshold, PDSCH TCI may follow a TCI state of a lowest CORESET identifier of a search space in a latest monitored slot by the UE. In an implementation of the second scheme 554, when PDCCH used for the scheduling carries a non fall back DCI, the associated TCI states for the PDSCH may be indicated by a 3-bit indicator. In the third scheme 556, for CORESET i with non-fallback DCI and with no configured TCI, e.g., if the PDSCH TCI is not indicated in the PDCCH (in other words, no non fall back DCI), when K0 is greater than a threshold, PDSCH TCI may follow the TCI of a scheduling PDCCH with non-fallback DCI with no configured TCI. However, if K0 is less than or equal to the threshold, PDSCH TCI may follow a TCI state of a lowest CORESET identifier of a search space in a latest monitored slot by the UE.

As shown in FIG. 5B, the TCI states of the PDSCH is either indicated in the DCI of the scheduling PDCCH, follows the TCI state of the scheduling PDCCH or the TCI state of the of the monitored search space with the lowest CORESET-ID in the latest slot. When the PDSCH TCI state is derived from the monitored search space with the lowest CORESET-ID in the latest slot, the state is called the Default PDSCH TCI state.

In an aspect, for overlapping scenario 500, selection between beams associated with both cells may be determined based on priority. For example, if the priority is based on a cell, the target cell contents may be prioritized over the source cell. In this example, the priority may be established for a certain period of time and based on a timer expiry the priority may be switched to another cell. For example, if the priority is based on a channel, and if PDCCH has already been received by the UE without interruption, the priority may be set to the beam to receive the PDSCH while dropping the PDCCH from the other cell. For example, if the priority is based on quality of service (QoS), and assuming that the overlap channels are both PDSCHs but associated with different applications (e.g., EMBB and URLLC), the QoS of the applications may be determined and a higher priority may be given to applications with higher QoS, e.g. URLLC.

Figure 6:
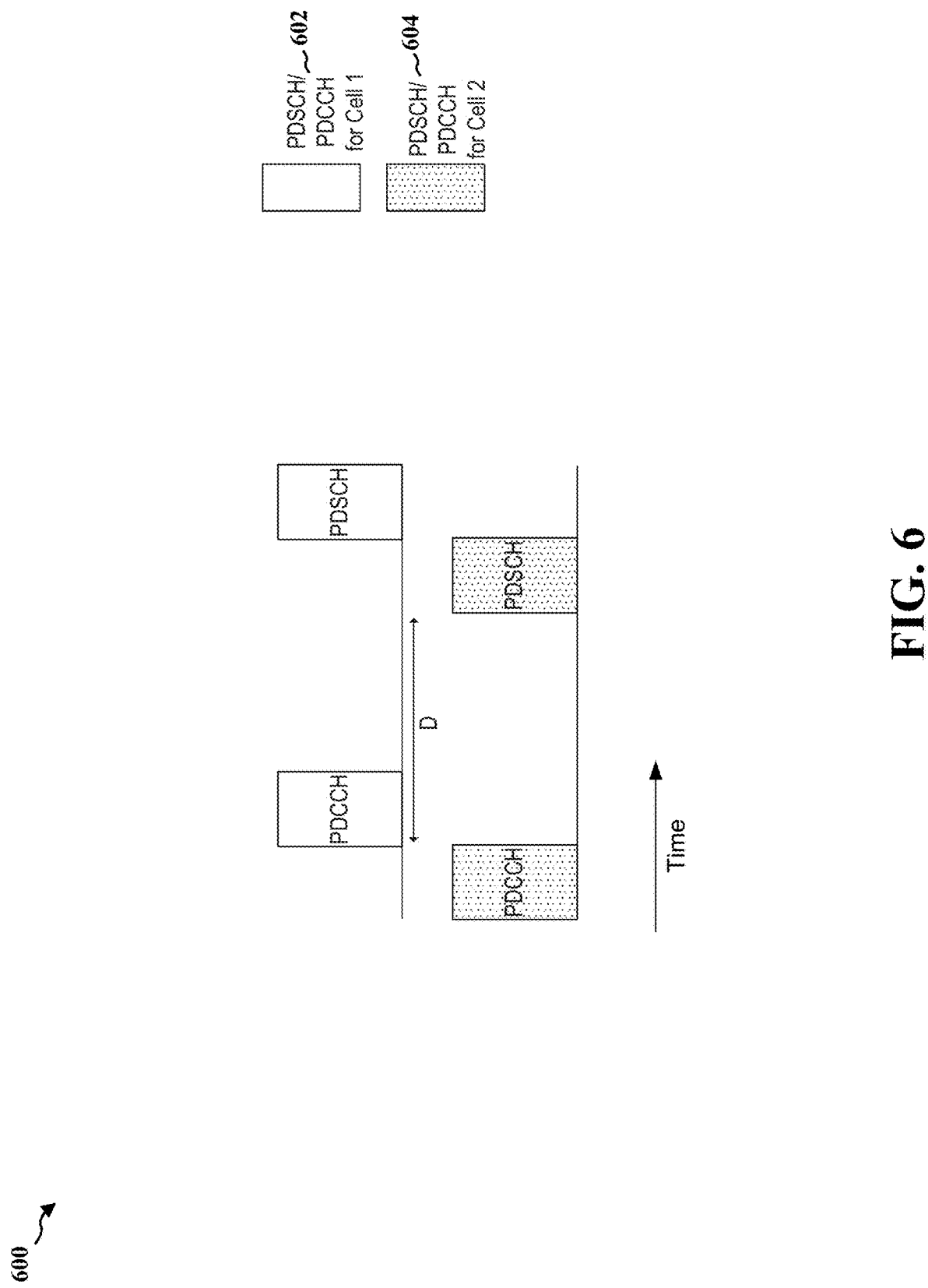
FIG. 6 is a diagram of signaling over time illustrating another example of a non-overlapping scenario for beam detection during DAPS HO.

Referring back to FIG. 5A, in an aspect, for the non-overlapping scenario 506, if the distance (represented by arrows) between the physical channels from both cells is large enough for beam switching (i.e., a configured threshold), then the beam selection will be performed as described above. However, in an example where the distance between the physical channels from both cells is not large enough for beam switching, the UE may make certain determinations. For example, the earliest physical channel may be received and the UE may start on this beam to receive the second physical channel. In another example, due to earlier received PDCCH on a priority cell, the UE may choose to use the beam for the PDSCH of the priority cell because the UE has already knows the PDSCH from the source cell but no the PDSCH from the target cell. d FIG. 6 is a diagram 600 illustrating another example of a non-overlapping scenario for beam detection during DAPS HO between a UE and a source cell and a target cell. For example, the UE may be similar to or the same as UE 104 of FIG. 1, and the source cell and the target cell may be similar to or the same as base stations 102.

In an aspect, in non-overlapping scenario 600, the distance D, which may be defined by a time duration or an amount of time, between the PDCCH 604 of cell 2 and PDSCH 602 of cell 1 is not large enough for beam switching to occur. In this example, cell 2 is the priority cell (e.g., the target cell). Accordingly, the UE may determine to use the beam for PDCCH 604 of cell 2 and the determined beam for PDSCH 604 for cell 2.

Figure 7:
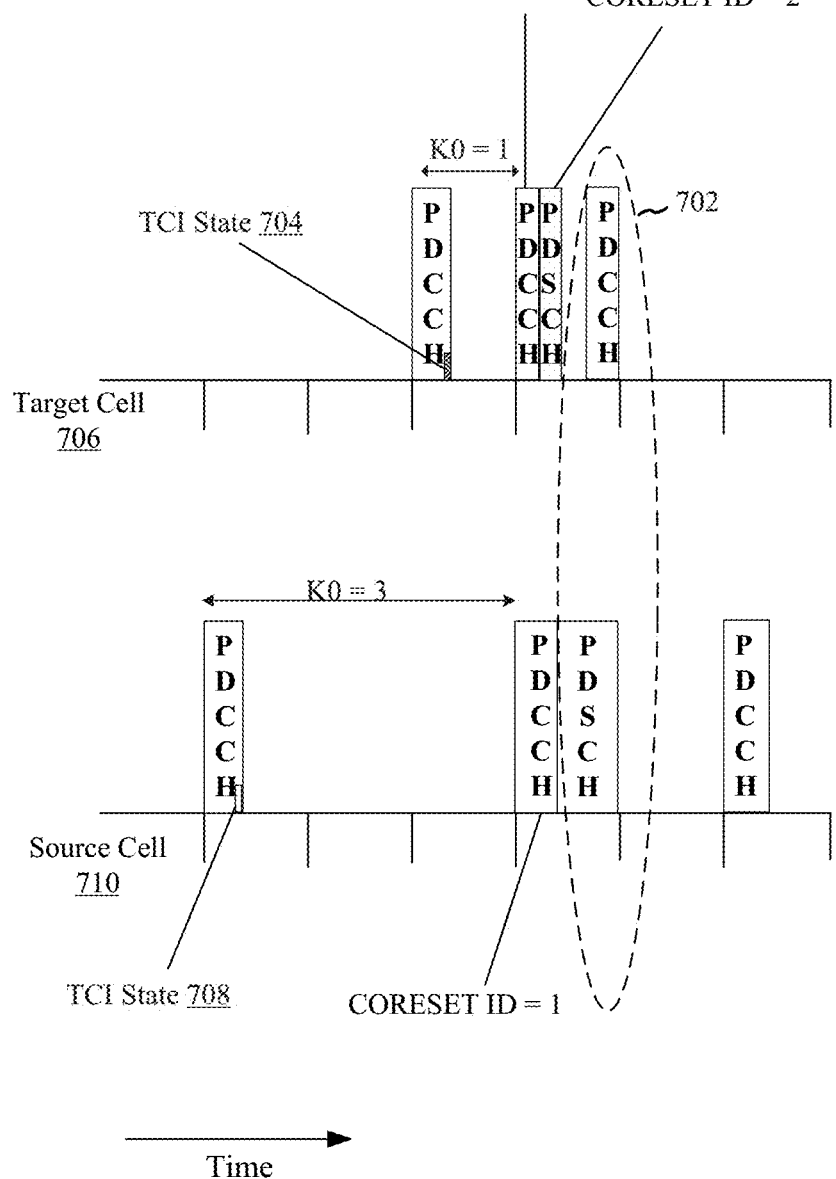
FIG. 7 is a conceptual diagram of an example of overlapping transmission configuration states (TCI) in accordance with various aspects of the present disclosure.

FIG. 7 is a conceptual diagram 700 of overlapping PDSCHs with different TCI states. Specifically, when a default PDSCH TCI state overlaps with a PDSCH with a TCI state derived from the DCI, as indicated by 702, the UE may perform at least one of two actions. In one example, the UE may select the TCI state 704 of the target cell 706, since the target cell 706 is a priority during DAPS handover. In another example, the UE may select a TCI state 708 from the DCI of a PDCCH of the source cell 710, as this may be a more reliable TCI state.

In some aspects, the PDSCH with an reliable TCI state may be explicitly indicated in the DCI or indicated by the TCI of the scheduling PDCCH. In some aspects, the PDSCH with an unreliable state may indicate that the PDSCH TCI state may be derived from the monitored search space with the lowest CORESET identifier (CORESET-ID) in the latest slot. Further, the selection may be based on at least one of a reliability corresponding to the PDSCH with explicitly signaling TCI states, a type of cell (e.g., which implies given priority to a type—source or target cell), or a network configuration (e.g., network can send a UE a pattern of which TCI to select).

Figure 8:
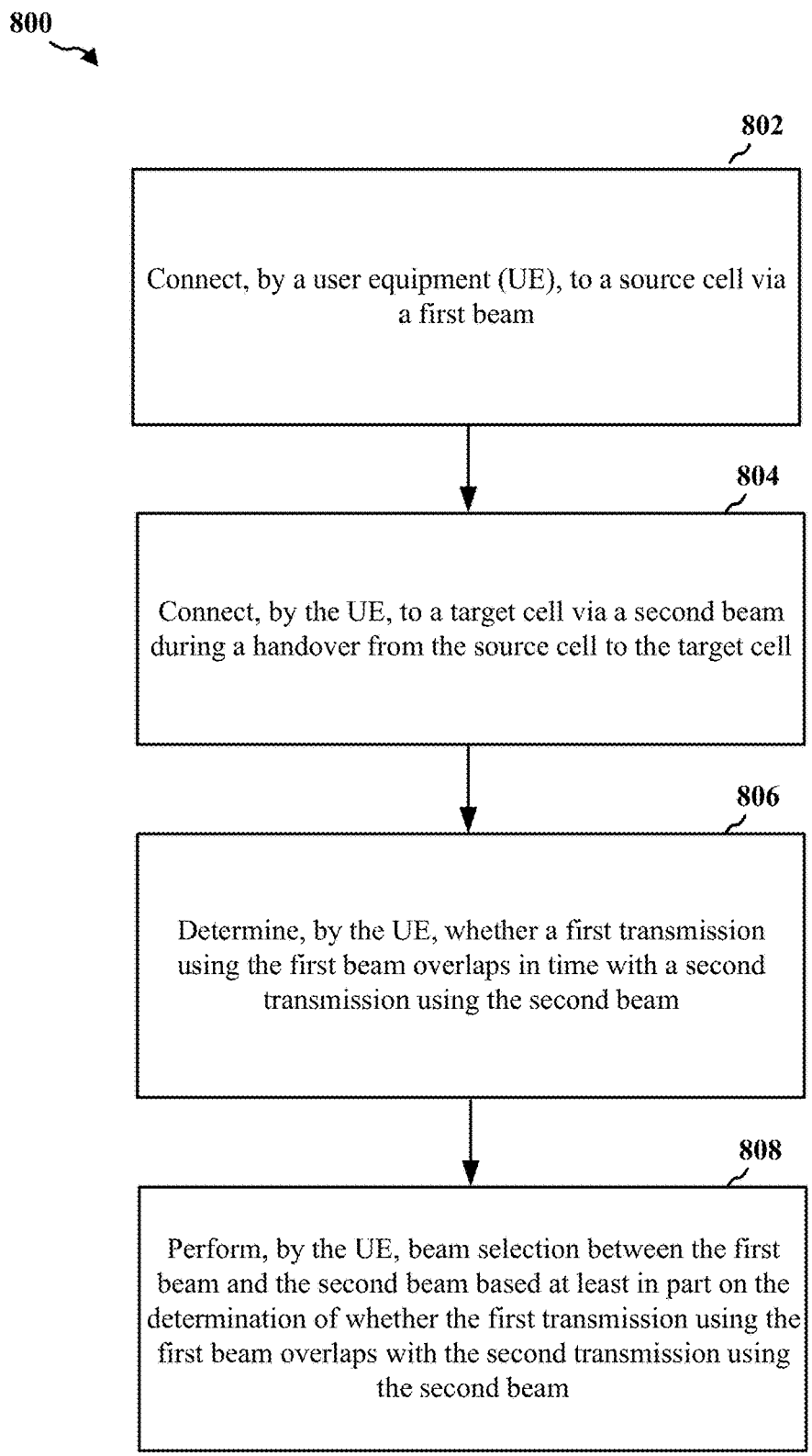
FIG. 8 is a flowchart of a method of wireless communication of a UE capable of performing beam selection during a DAPS HO.

FIG. 8 is a flowchart 800 of a method of wireless communication. The method may be performed by a UE (e.g., the UE 104; the apparatus 350; the controller/processor 359, which may include the memory 360, processor(s) 912, which may include the memory 916, modem 940 and which may be the entire UE 104 or a component of the UE 104, such as the TX processor 368, the RX processor 356, and/or the transceiver 902).

At 802, method 800 includes connecting, by a user equipment (UE), to a source cell via a first beam. In an aspect, the UE 104 and/or the communication component 198/configuration component 240, e.g., in conjunction with controller/processor 359, which may include the memory 360, processor(s) 912, which may include the memory 916, modem 940, TX processor 368, and transceiver 902 may connect to a source cell via a first beam. As such, the UE 104 and/or the communication component 198/configuration component 240, e.g., in conjunction with controller/processor 359, which may include the memory 360, processor(s) 912, which may include the memory 916, modem 940, TX processor 368, and transceiver 902 may define a means for connecting, by a user equipment (UE), to a source cell via a first beam.

At 804, method 800 includes connecting, by the UE, to a target cell via a second beam during a handover from the source cell to the target cell. In an aspect, the UE 104 and/or the communication component 198/configuration component 240, e.g., in conjunction with controller/processor 359, which may include the memory 360, processor(s) 912, which may include the memory 916, modem 940, RX processor 356, and transceiver 902 may connect to a target cell via a second beam during a handover from the source cell to the target cell. As such, communication component 198/configuration component 240, e.g., in conjunction with controller/processor 359, which may include the memory 360, processor(s) 912, which may include the memory 916, modem 940, RX processor 356, and transceiver 902 may define a means for connecting, by the UE, to a target cell via a second beam during a handover from the source cell to the target cell.

At 806, method 800 includes determining, by the UE, whether a first transmission using the first beam overlaps in time with a second transmission using the second beam. In an aspect, the UE 104 and/or the communication component 198/configuration component 240, e.g., in conjunction with controller/processor 359, which may include the memory 360, processor(s) 912, which may include the memory 916, modem 940, RX processor 356, and transceiver 902 may determine whether a first transmission using the first beam overlaps in time with a second transmission using the second beam. As such, communication component 198/configuration component 240, e.g., in conjunction with controller/processor 359, which may include the memory 360, processor(s) 912, which may include the memory 916, modem 940, RX processor 356, and transceiver 902 may define a means for determining, by the UE, whether a first transmission using the first beam overlaps in time with a second transmission using the second beam.

At 808, method 800 includes performing, by the UE, beam selection between the first beam and the second beam based at least in part on the determination of whether the first transmission using the first beam overlaps with the second transmission using the second beam. In an aspect, the UE 104 and/or the communication component 198/configuration component 240, e.g., in conjunction with controller/processor 359, which may include the memory 360, processor(s) 912, which may include the memory 916, modem 940, RX processor 356, and transceiver 902 may perform beam selection between the first beam and the second beam based at least in part on the determination of whether the first transmission using the first beam overlaps with the second transmission using the second beam. As such, communication component 198/configuration component 240, e.g., in conjunction with controller/processor 359, which may include the memory 360, processor(s) 912, which may include the memory 916, modem 940, RX processor 356, and transceiver 902 may define a means for performing, by the UE, beam selection between the first beam and the second beam based at least in part on the determination of whether the first transmission using the first beam overlaps with the second transmission using the second beam.

In an example of method 800, performing beam selection further comprises performing beam selection between the first beam and the second beam based on one or more parameters in response to the determination that the first transmission using the first beam and the second transmission using the second beam overlap.

In an example, method 800 includes the one or more parameters includes at least one of a type of cell, a type of channel, and a quality of service (QoS).

In an example of method 800, performing beam selection between the first beam and the second beam is based at least in part on the one or more parameters in response to the determination that the first transmission using the first beam and the second transmission using the second beam overlap. The beam selection may further comprises: establishing, by the UE, a time period for prioritizing the target cell over the source cell; performing, by the UE, beam selection with the target cell over the source cell for the time period; determining, by the UE, whether a prioritization timer corresponding to the time period has expired; and performing, by the UE, beam selection to switch from the target cell to the source cell based on the determination that the prioritization timer has expired.

In an example, method 800 includes maintaining, by the UE, the beam selection with the target cell over the source cell based on the determination that the prioritization timer has not expired.

In an example of method 800, performing beam selection between the first beam and the second beam based at least in part on the one or more parameters in response to the determination that the first transmission using the first beam overlaps the second transmission using the second beam further comprises: determining, by the UE, that a first Physical Downlink Control Channel (PDCCH) beam corresponding to one of the source cell or the target cell is received without interruption; performing, by the UE, beam selection for a reception of a Physical Downlink Shared Channel (PDSCH) beam associated with the PDCCH beam over a reception of a second PDCCH corresponding to the other one of the source cell or the target cell.

In an example of method 800, performing beam selection for the reception of the PDSCH beam associated with the PDCCH beam over the reception of the second PDCCH corresponding to the other one of the source cell or the target cell further comprises performing beam selection for the reception of the PDSCH beam associated with the PDCCH beam over the reception of the second PDCCH corresponding to the other one of the source cell or the target cell based on a determination that a prioritization timer has not expired.

In an example of method 800, performing beam selection between the first beam and the second beam based on the one or more parameters in response to the determination that the first transmission using the first beam overlaps the second transmission using the second beam further comprises: determining, by the UE, that the first beam and the second beam correspond to overlapping PDSCHs; determining, by the UE, a priority level of a first application associated with the first beam and a priority level of a second application associated with the second beam; performing, by the UE, beam selection with the target cell over the source cell based on the determination that the priority level of the first application associated with the first beam is prioritized than the priority level of the second application associated with the second beam; and performing, by the UE, beam selection with the source cell over the target cell based on the determination that the priority level of the first application associated with the first beam is higher than the priority level of the second application associated with the second beam.

In an example of method 800, performing beam selection with the target cell over the source cell based on the determination that the priority level of the first application associated with the first beam is prioritized than the priority level of the second application associated with the second beam further comprises performing beam selection with the target cell over the source cell based on a determination that a prioritization timer has not expired.

In an example of method 800, performing beam selection further comprises performing beam selection between the first beam and the second beam based at least in part on the determination that the first transmission using the first beam does not overlap with the second transmission using the second beam.

In an example of method 800, performing beam selection between the first beam and the second beam based at least in part on the determination that the first transmission using the first beam does not overlap the second transmission using the second beam further comprises determining, by the UE, that a distance in time between one or more of the physical channels of the source cell and the target cell fails to satisfy a beam switching threshold.

In an example, method 800 includes identifying, by the UE, an earliest received physical channel from either the source cell or the target cell; and performing, by the UE, beam selection with either the source cell or the target cell associated with the earliest received physical channel.

In an example, method 800 includes determining, by the UE, that a first PDCCH, associated with the target cell having priority over the source cell, is received before a second PDCCH associated with the source cell; and performing, by the UE, beam selection for a PDSCH associated with the target cell.

In an example of method 800, performing beam selection between the first beam and the second beam in response to a determination that the first transmission using the first beam does not overlap with the second transmission using the second beam further comprises: determining, by the UE, that a distance in time between reception of a PDCCH associated with the source cell and a PDSCH associated with the target fails to satisfy a beam switching threshold, wherein the target cell has priority over the source cell; utilizing, by the UE, a beam for a PDCCH associated with the target cell and a determined beam for the PDSCH associated with the target cell.

Figure 9:
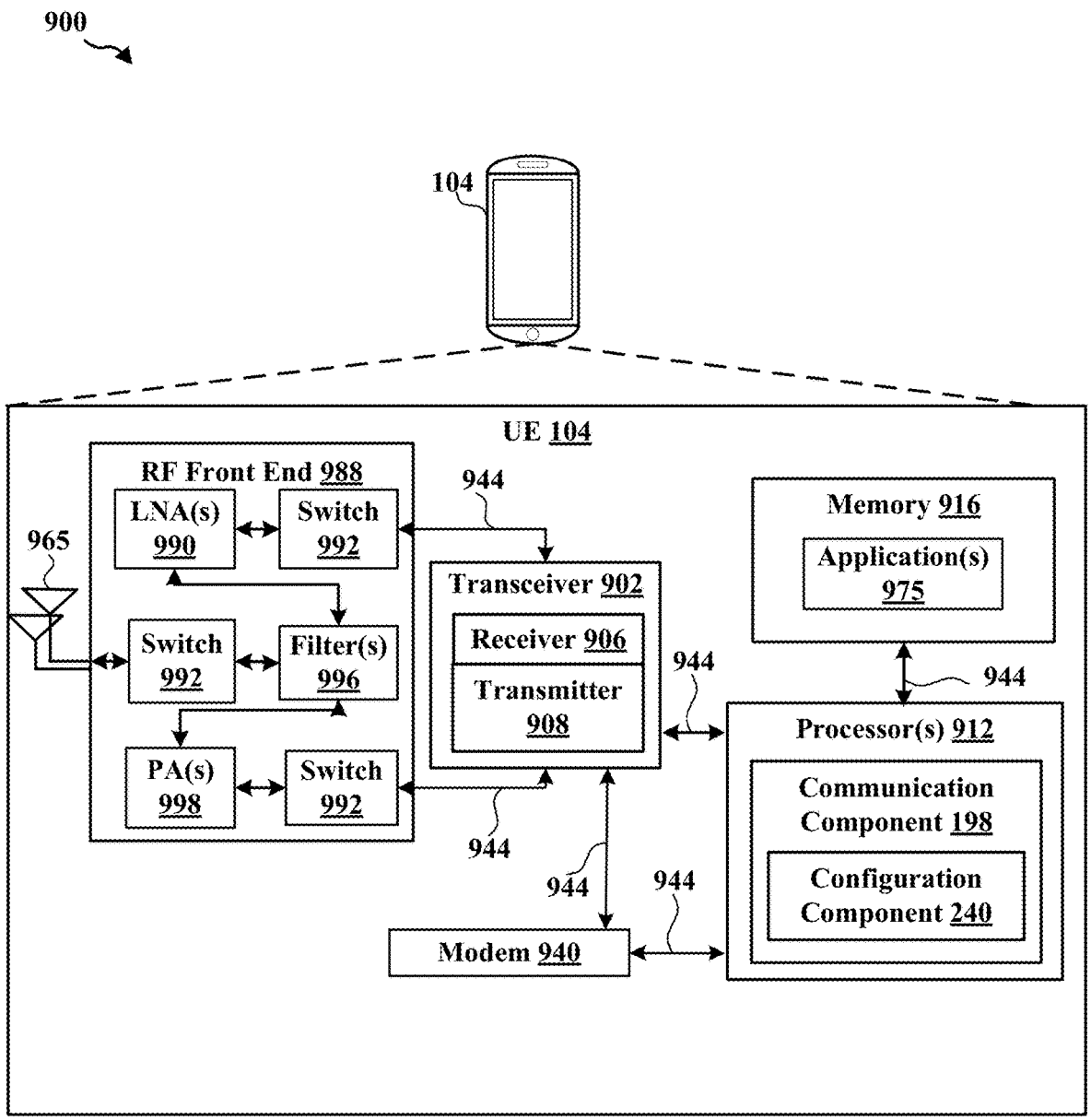
FIG. 9 is a block diagram illustrating an example of a UE, in accordance with various aspects of the present disclosure.

Referring to FIG. 9, one example of an implementation of UE 104 may include a variety of components, some of which have already been described above and are described further herein, including components such as one or more processors 912 and memory 916 and transceiver 902 in communication via one or more buses 944, which may operate in conjunction with modem 940 and/or CC/BWP group communication component 198 for beam determination for NR Dual Active Protocol Stack (DAPS) handover (HO).

In an aspect, the one or more processors 912 can include a modem 940 and/or can be part of the modem 940 that uses one or more modem processors. Thus, the various functions related to communication component 198 may be included in modem 940 and/or processors 912 and, in an aspect, can be executed by a single processor, while in other aspects, different ones of the functions may be executed by a combination of two or more different processors. For example, in an aspect, the one or more processors 912 may include any one or any combination of a modem processor, or a baseband processor, or a digital signal processor, or a transmit processor, or a receiver processor, or a transceiver processor associated with transceiver 902. In other aspects, some of the features of the one or more processors 912 and/or modem 940 associated with communication component 198 may be performed by transceiver 902.

Also, memory 916 may be configured to store data used herein and/or local versions of applications 975 or communicating component 942 and/or one or more of its subcomponents being executed by at least one processor 912. Memory 916 can include any type of computer-readable medium usable by a computer or at least one processor 912, such as random access memory (RAM), read only memory (ROM), tapes, magnetic discs, optical discs, volatile memory, non-volatile memory, and any combination thereof. In an aspect, for example, memory 916 may be a non-transitory computer-readable storage medium that stores one or more computer-executable codes defining communication component 198 and/or one or more of its subcomponents, and/or data associated therewith, when UE 104 is operating at least one processor 912 to execute communication component 198 and/or one or more of its subcomponents.

Transceiver 902 may include at least one receiver 906 and at least one transmitter 908. Receiver 906 may include hardware and/or software executable by a processor for receiving data, the code comprising instructions and being stored in a memory (e.g., computer-readable medium). Receiver 906 may be, for example, a radio frequency (RF) receiver. In an aspect, receiver 906 may receive signals transmitted by at least one base station 102. Additionally, receiver 906 may process such received signals, and also may obtain measurements of the signals, such as, but not limited to, Ec/Io, signal-to-noise ratio (SNR), reference signal received power (RSRP), received signal strength indicator (RSSI), etc. Transmitter 908 may include hardware and/or software executable by a processor for transmitting data, the code comprising instructions and being stored in a memory (e.g., computer-readable medium). A suitable example of transmitter 908 may including, but is not limited to, an RF transmitter.

Moreover, in an aspect, UE 104 may include RF front end 988, which may operate in communication with one or more antennas 965 and transceiver 902 for receiving and transmitting radio transmissions, for example, wireless communications transmitted by at least one base station 102 or wireless transmissions transmitted by UE 104. RF front end 988 may be connected to one or more antennas 965 and can include one or more low-noise amplifiers (LNAs) 990, one or more switches 992, one or more power amplifiers (PAs) 998, and one or more filters 996 for transmitting and receiving RF signals.

In an aspect, LNA 990 can amplify a received signal at a desired output level. In an aspect, each LNA 990 may have a specified minimum and maximum gain values. In an aspect, RF front end 988 may use one or more switches 992 to select a particular LNA 990 and its specified gain value based on a desired gain value for a particular application.

Further, for example, one or more PA(s) 998 may be used by RF front end 988 to amplify a signal for an RF output at a desired output power level. In an aspect, each PA 998 may have specified minimum and maximum gain values. In an aspect, RF front end 988 may use one or more switches 992 to select a particular PA 998 and its specified gain value based on a desired gain value for a particular application.

Also, for example, one or more filters 996 can be used by RF front end 988 to filter a received signal to obtain an input RF signal. Similarly, in an aspect, for example, a respective filter 996 can be used to filter an output from a respective PA 998 to produce an output signal for transmission. In an aspect, each filter 996 can be connected to a specific LNA 990 and/or PA 998. In an aspect, RF front end 988 can use one or more switches 992 to select a transmit or receive path using a specified filter 996, LNA 990, and/or PA 998, based on a configuration as specified by transceiver 902 and/or processor 912.

As such, transceiver 902 may be configured to transmit and receive wireless signals through one or more antennas 965 via RF front end 988. In an aspect, transceiver may be tuned to operate at specified frequencies such that UE 104 can communicate with, for example, one or more base stations 102 or one or more cells associated with one or more base stations 102. In an aspect, for example, modem 940 can configure transceiver 902 to operate at a specified frequency and power level based on the UE configuration of the UE 104 and the communication protocol used by modem 940.

In an aspect, modem 940 can be a multiband-multimode modem, which can process digital data and communicate with transceiver 902 such that the digital data is sent and received using transceiver 902. In an aspect, modem 940 can be multiband and be configured to support multiple frequency bands for a specific communications protocol. In an aspect, modem 940 can be multimode and be configured to support multiple operating networks and communications protocols. In an aspect, modem 940 can control one or more components of UE 104 (e.g., RF front end 988, transceiver 902) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 942 can optionally include mode determining component 952. For example, upon receiving an anchor signal in an initial bandwidth portion from a network entity 102, the anchor signal triggering an initial access procedure for the UE 104, mode determining component 952 may determine whether to operate in a wideband OFDM mode or a wideband SC-FDM mode in response to receiving the anchor signal. Communicating component 942 may then transmit a capability report message to the network entity 102 based on the determination by the mode determining component 952 of whether to operate in the wideband OFDM mode or the wideband SC-FDM mode In an aspect, the processor(s) 912 may correspond to one or more of the processors described in connection with the UE in FIG. 3. Similarly, the memory 916 may correspond to the memory described in connection with the UE in FIG. 3.

Figure 10:
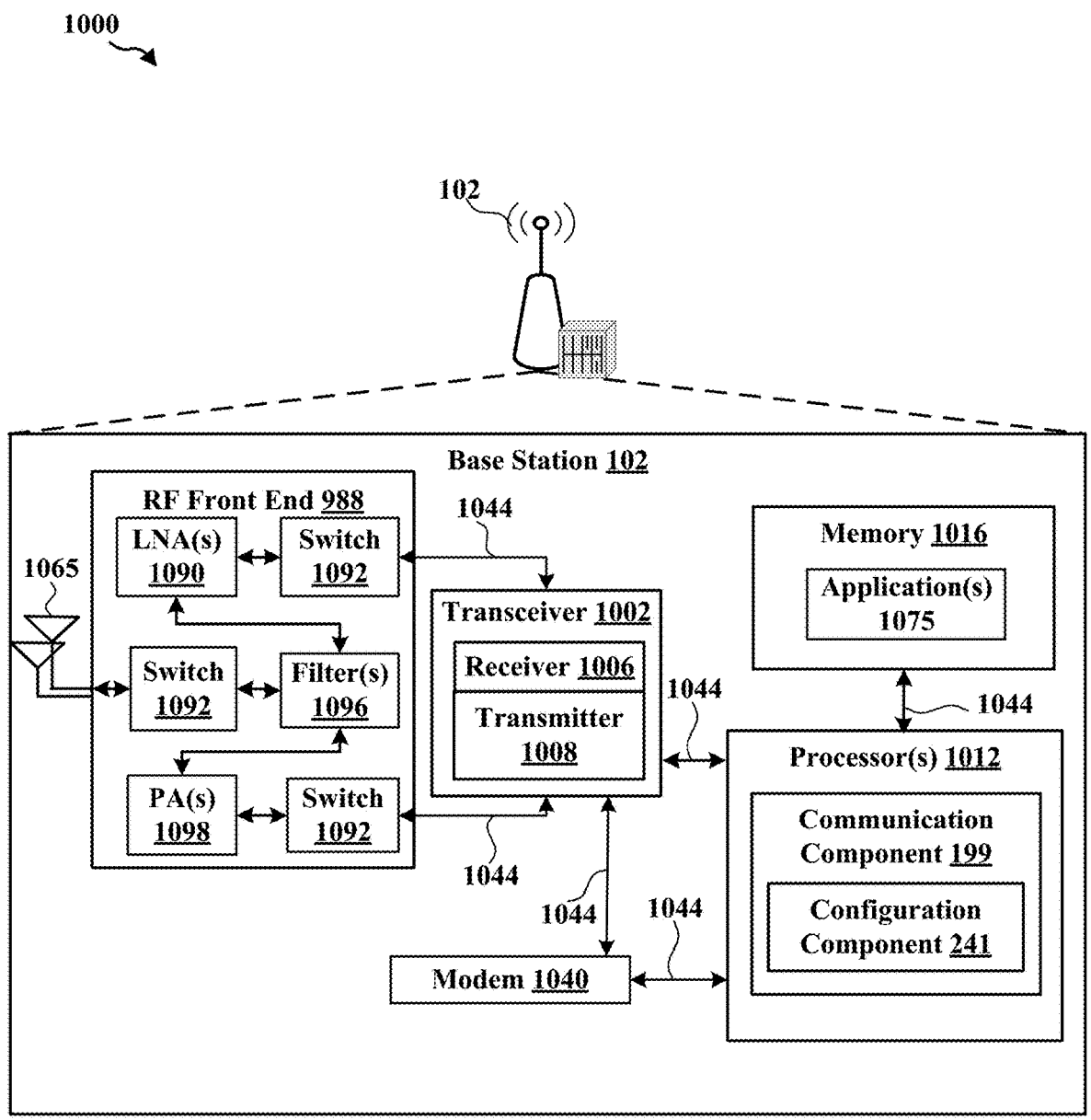
FIG. 10 is a block diagram illustrating an example of a base station, in accordance with various aspects of the present disclosure.

Referring to FIG. 10, one example of an implementation of base station 102 (e.g., a base station 102, as described above) may include a variety of components, some of which have already been described above, but including components such as one or more processors 1012 and memory 1016 and transceiver 1002 in communication via one or more buses 1044, which may operate in conjunction with modem 1040 and communication component 199 for communicating reference signals.

The transceiver 1002, receiver 1006, transmitter 1008, one or more processors 1012, memory 1016, applications 1075, buses 1044, RF front end 1088, LNAs 1090, switches 1092, filters 1096, PAs 1098, and one or more antennas 1065 may be the same as or similar to the corresponding components of UE 104, as described above, but configured or otherwise programmed for base station operations as opposed to UE operations.

In an aspect, the processor(s) 1012 may correspond to one or more of the processors described in connection with the base station in FIG. 3. Similarly, the memory 1016 may correspond to the memory described in connection with the base station in FIG. 3.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a user equipment (UE), comprising:
 a transceiver;
 a memory configured to store instructions; and
 one or more processors communicatively coupled with the transceiver and the memory, wherein the one or more processors are configured to:
  connect to a source cell via a first beam;
  connect to a target cell via a second beam during a handover from the source cell to the target cell;
  determine whether a first transmission using the first beam overlaps in time with a second transmission using the second beam; and
  in response to determining that the first transmission overlaps in time with the second transmission;
   establish a time period for prioritizing the target cell over the source cell;
   select the target cell over the source cell for the time period; and
   switch from the target cell to the source cell at an end of the time period.

2. The apparatus of claim 1, wherein selection is further performed based on at least one of a type of cell, a type of channel, or a quality of service (QoS).

3. The apparatus of claim 1, wherein the one or more processors are configured to maintain the selection with the target cell over the source cell based on the determination that the time period has not expired.

4. The apparatus of claim 1, wherein the one or more processors are further configured to forgo performing the selection based at least in part on the determination that the first transmission using the first beam does not overlap with the second transmission using the second beam.

5. The apparatus of claim 4, wherein the one or more processors are further configured to determine that a distance in time between physical channels of the source cell and the target cell fails to satisfy a beam switching threshold.

6. The apparatus of claim 5, wherein the one or more processors are configured to:
 identify an earliest received physical channel from either the source cell or the target cell; and
 perform the selection with either the source cell or the target cell associated with the earliest received physical channel.

7. The apparatus of claim 5, wherein the one or more processors are configured to:
 determine that a first Physical Downlink Control Channel (PDCCH), associated with the target cell having priority over the source cell, is received before a second PDCCH associated with the source cell; and
 select for a Physical Downlink Shared Channel (PDSCH) associated with the target cell.

8. The apparatus of claim 4, wherein the one or more processors configured to forgo selection are further configured to:
 determine that a distance in time between reception of a Physical Downlink Control Channel (PDCCH) associated with the source cell and a Physical Downlink Shared Channel (PDSCH) associated with the target fails to satisfy a beam switching threshold, wherein the target cell has priority over the source cell; and
 utilize a beam for a PDCCH associated with the target cell and a determined beam for the PDSCH associated with the target cell.

9. A method of wireless communication at a user equipment (UE), comprising:
 connecting to a source cell via a first beam;
 connecting to a target cell via a second beam during a handover from the source cell to the target cell;
 determining whether a first transmission using the first beam overlaps in time with a second transmission using the second beam; and
 in response to determining that the first transmission overlaps in time with the second transmission;
  establishing a time period for prioritizing the target cell over the source cell;

selecting the target cell over the source cell for the time period; and switching from the target cell to the source cell at an end of the time period.

10. The method of claim 9, wherein selection is further performed based on at least one of a type of cell, a type of channel, or a quality of service (QoS).

11. The method of claim 9, further comprising maintaining the selection with the target cell over the source cell based on the determination that the time period has not expired.

12. The method of claim 9, wherein the selection further comprises selecting based at least in part on the determination that the first transmission using the first beam does not overlap with the second transmission using the second beam.

13. The method of claim 12, further comprising:
determining that a distance in time between reception of a Physical Downlink Control Channel (PDCCH) associated with the source cell and a Physical Downlink Shared Channel (PDSCH) associated with the target fails to satisfy a beam switching threshold, wherein the target cell has priority over the source cell; and
utilizing a beam for a PDCCH associated with the target cell and a determined beam for the PDSCH associated with the target cell.

14. The method of claim 12, wherein the selecting further comprises determining, by the UE, that a distance in time between physical channels of the source cell and the target cell fails to satisfy a beam switching threshold.

15. The method of claim 14, further comprising:
identifying an earliest received physical channel from either the source cell or the target cell; and
performing the selection with either the source cell or the target cell associated with the earliest received physical channel.

16. The method of claim 14, further comprising:
determining that a first Physical Downlink Control Channel (PDCCH), associated with the target cell having priority over the source cell, is received before a second PDCCH associated with the source cell; and
select for a Physical Downlink Shared Channel (PDSCH) associated with the target cell.

17. An apparatus for wireless communication at a user equipment (UE), comprising:
means for connecting to a source cell via a first beam;
means for connecting to a target cell via a second beam during a handover from the source cell to the target cell;
means for determining whether a first transmission using the first beam overlaps in time with a second transmission using the second beam;
means for establishing, in response to determining that the first transmission overlaps in time with the second transmission, a time period for prioritizing the target cell over the source cell;
means for selecting the target cell over the source cell for the time period; and
means for switching from the target cell to the source cell at an end of the time period.

18. The apparatus of claim 17, wherein selection is further performed based on at least one of a type of cell, a type of channel, or a quality of service (QoS).

19. The apparatus of claim 17, further comprising means for maintaining the selection with the target cell over the source cell based on the determination that the time period has not expired.

20. The apparatus of claim 17, wherein means for selecting further comprises means for selecting based at least in part on the determination that the first transmission using the first beam does not overlap with the second transmission using the second beam.

21. The apparatus of claim 20, wherein means for selecting further comprises means for determining, by the UE, that a distance in time between physical channels of the source cell and the target cell fails to satisfy a beam switching threshold.

22. The apparatus of claim 20, further comprising:
means for determining that a distance in time between reception of a Physical Downlink Control Channel (PDCCH) associated with the source cell and a Physical Downlink Shared Channel (PDSCH) associated with the target fails to satisfy a beam switching threshold, wherein the target cell has priority over the source cell; and
means for utilizing a beam for a PDCCH associated with the target cell and a determined beam for the PDSCH associated with the target cell.

23. The apparatus of claim 21, further comprising:
means for identifying an earliest received physical channel from either the source cell or the target cell; and
means for selecting with either the source cell or the target cell associated with the earliest received physical channel.

24. The apparatus of claim 21, further comprising:
means for determining that a first Physical Downlink Control Channel (PDCCH), associated with the target cell having priority over the source cell, is received before a second PDCCH associated with the source cell; and
means for selecting for a Physical Downlink Shared Channel (PDSCH) associated with the target cell.

25. A non-transitory computer-readable medium, comprising code executable by one or more processors to:
connect to a source cell via a first beam;
connect to a target cell via a second beam during a handover from the source cell to the target cell;
determine that a first transmission using the first beam overlaps in time with a second transmission using the second beam;
establish, in response to determining that the first transmission overlaps in time with the second transmission, a time period for prioritizing the target cell over the source cell;
select the target cell over the source cell for the time period; and
switch from the target cell to the source cell at an end of the time period.

26. The computer-readable medium of claim 25, wherein selection is further performed based on at least one of a type of cell, a type of channel, or a quality of service (QoS).

27. The computer-readable medium of claim 25, further comprising code executable by one or more processors to maintain the selection with the target cell over the source cell based on the determination that the time period has not expired.

28. The computer-readable medium of claim 25, further comprising code executable by one or more processors to forgo the selection based at least in part on the determination that the first transmission using the first beam does not overlap with the second transmission using the second beam.

29. The computer-readable medium of claim 28, further comprising code executable by one or more processors to determine that a distance in time between physical channels of the source cell and the target cell fails to satisfy a beam switching threshold.

30. The computer-readable medium of claim 28, further comprising code executable by one or more processors to:
   determine that a distance in time between reception of a Physical Downlink Control Channel (PDCCH) associated with the source cell and a Physical Downlink Shared Channel (PDSCH) associated with the target fails to satisfy a beam switching threshold, wherein the target cell has priority over the source cell; and
   utilize a beam for a PDCCH associated with the target cell and a determined beam for the PDSCH associated with the target cell.

31. The computer-readable medium of claim 29, further comprising code executable by one or more processors to:
   identify an earliest received physical channel from either the source cell or the target cell; and
   select either the source cell or the target cell associated with the earliest received physical channel.

32. The computer-readable medium of claim 29, further comprising code executable by one or more processors to:
   determine that a first Physical Downlink Control Channel (PDCCH), associated with the target cell having priority over the source cell, is received before a second PDCCH associated with the source cell; and
   select for a Physical Downlink Shared Channel (PDSCH) associated with the target cell.

* * * * *